United States Patent [19]
Hirsh et al.

[11] Patent Number: 5,170,664
[45] Date of Patent: Dec. 15, 1992

[54] MOUNTABLE FORCE MEASUREMENT APPARATUS

[75] Inventors: Louis S. Hirsh; Timothy Mechaley, both of Omaha, Nebr.

[73] Assignee: International Athletic World, Inc., Omaha, Nebr.

[21] Appl. No.: 414,099

[22] Filed: Sep. 28, 1989

[51] Int. Cl.$^5$ .................... G01P 1/00; A63B 69/36
[52] U.S. Cl. ..................... 73/493; 273/26 B; 273/186.2; 73/492
[58] Field of Search ............ 73/492, 493; 273/26 B, 273/186 A, 186 R

[56] References Cited

U.S. PATENT DOCUMENTS

| | | | |
|---|---|---|---|
| 2,543,722 | 2/1951 | Hetzel | 73/493 |
| 3,106,403 | 10/1963 | Kirkman | 273/186 A |
| 3,561,272 | 2/1971 | Davis | 73/493 |
| 3,848,873 | 11/1974 | Linning | 273/186 A |

*Primary Examiner*—John E. Chapman
*Attorney, Agent, or Firm*—George R. Nimmer

[57] ABSTRACT

A conventional centrifugal forcemeter having a centrifugally leadwardly extendable spindle is trailwardly provided with a fixture having an underlying trough portion abuttable against the external contour of a baseball bat, a golfclub, or other selectable athletic club. Flanking the fixture underlying trough are two plurally-tabbed rows. A flexible girthing band, preferably of annular shape and of elastic material, engages at least one ear-like tab of each fixture row and tightly girds the athletic club to maintain the fixtured forcemeter in removably attached, secure and operable condition to the selected athletic club.

7 Claims, 3 Drawing Sheets

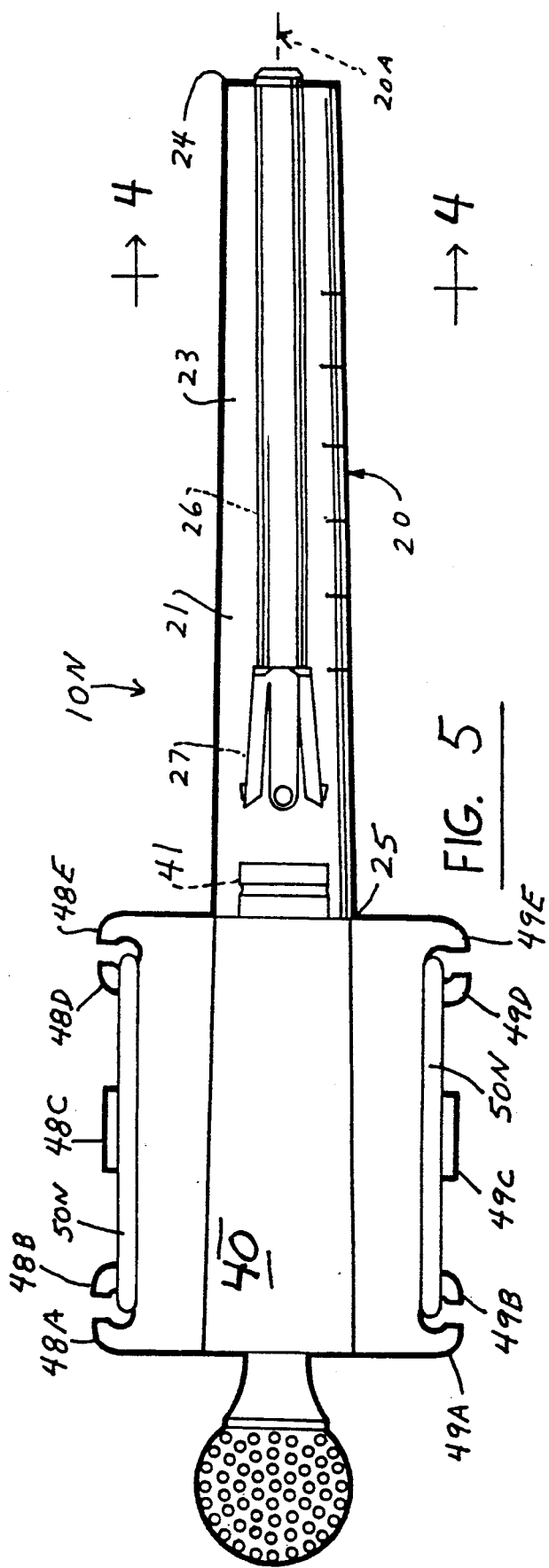
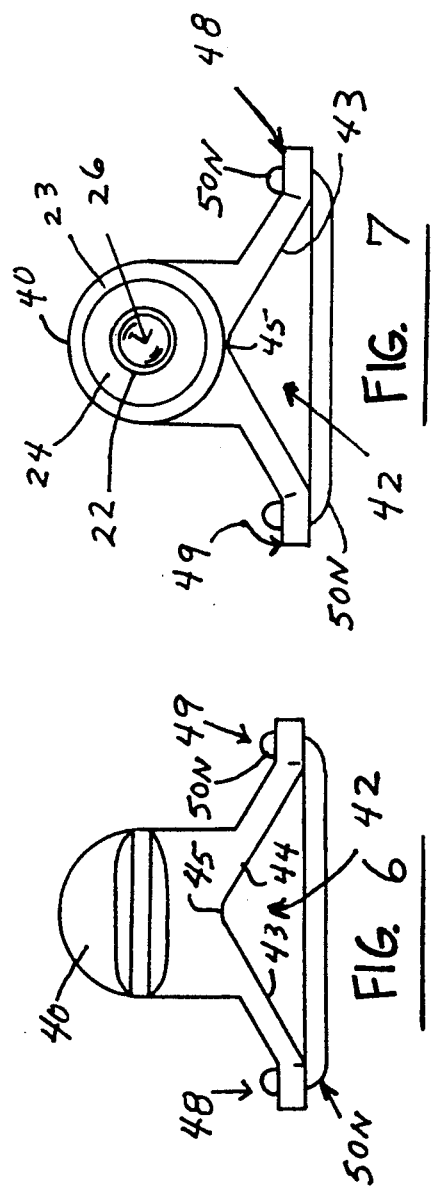
FIG. 5
FIG. 7
FIG. 6

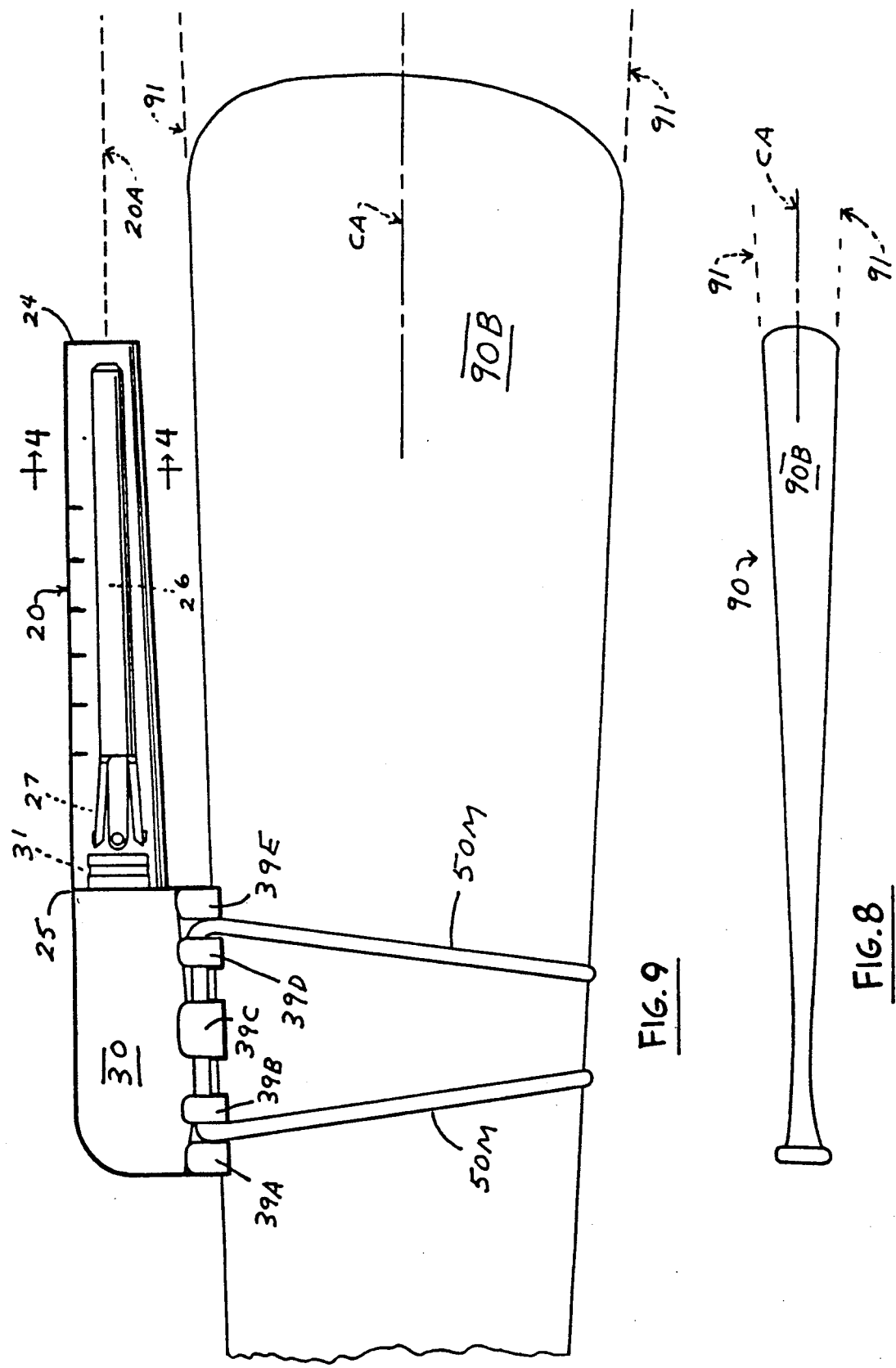

MOUNTABLE FORCE MEASUREMENT APPARATUS

BACKGROUND OF THE INVENTION

The prior art teaches the concept of a centrifugal forcemeter, which for practice sessions, is removably attached to a manually wieldable atheletic club (e.g. baseball bat, polo stick, golfclub, etc.). Accordingly, during practice sessions of whipping the club toward an imaginary projectile (e.g. baseball, polo puck, golfball, etc.), the forcemeter apprises the athlete of his ability to impart motive force to an actual projectile during a future athletic competition.

Because the centrifugal forcemeter tends to interfere with actual projectiles, and because athletic competition rules rarely permit contestants to be assisted by metering devices, prior to interspersed practice and competitive sessions the centrifugal forcemeter must be intermittently re-attached to and re-detached from the athletic club. In the latter regard, prior art workers have relied upon socalled releasably attachable adhesive tapes. However, the use of such adhesive tapes for this purpose is fraught with numerous disadvantages including: tapes are tedious to apply to and to detach from the forcemeter/athletic club combination; tapes tend to visually obscure the forcemeter measurement indicia; and tape adhesive eventually delaminates and permanently fouls the forcemeter.

GENERAL OBJECTIVE OF THE INVENTION

It is accordingly the general objective of the present invention to provide a mountable apparatus for readily, securely, and reliably attaching a centrifugal forcemeter to various athletic clubs during contest-interspersed practice sessions and which does not visually obscure the forcemeter measurement indicia, and which mounting apparatus can be quickly and cleanly detached from the athletic club immediately prior to intervening athletic contests.

GENERAL STATEMENT OF THE INVENTION

With the aforestated general objective in view, and together with other ancillary and specific objectives which will become more apparent as this description proceeds, the mountable force measurement apparatus of the present invention generally comprises: a conventional centrifugal forcemeter having a fixture attached to and extending trailwardly therefrom, said fixture comprising a trough having linearly generated and convergent trough-surfaces including a first-surface and a second-surface, both trough-surfaces being adapted to simultaneously abut a linearly generated length of an athletic club, the first-surface remote from the trough-surfaces convergency merging with a plural-tabs first-row, and said second-surface remote from the trough-surfaces convergency merging with a plural-tabs second-row; and flexible and preferably elastic girthing band means for engaging tabs of said first-row and second-row, whereby the girthing band means is adapted to provide removably attachment of the forcemeter-attached fixture to a said selectable athletic club.

BRIEF DESCRIPTION OF THE DRAWING

In the drawing, wherein like characters refer to like parts in the several views, and in which:

FIG. 5 is a top plan view of a second representative embodiment (10N) of the mountable force measurement apparatus of the present invention, and especially adapted for use with a golfclub type athletic club;

FIG. 6 is a trailward side elevational view of the FIG. 5 second embodiment;

FIG. 7 is a leadward side elevational view of the FIG. 5 second embodiment;

FIG. 8 is an elevational view of a typical baseball bat athletic club; and

FIG. 9 is a detail view of FIG. 8 and also showing the first representative embodiment (10M) in removably attached and operational condition therewith.

DETAILED DESCRIPTION OF THE DRAWING

Figure 1:
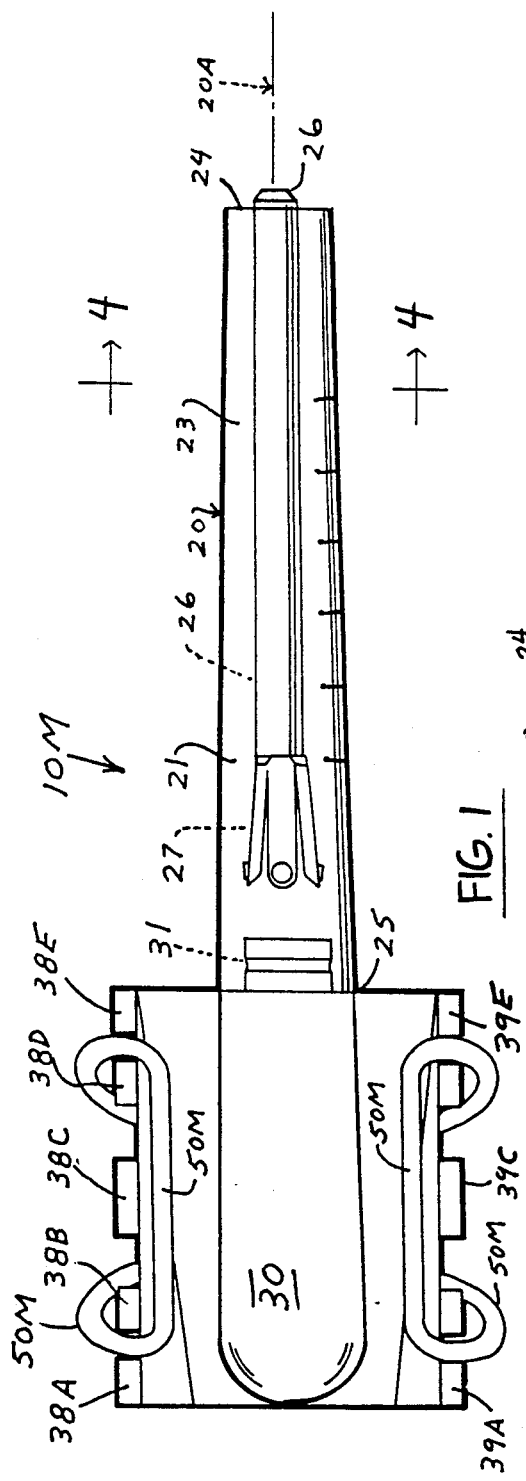
FIG. 1 is a top plan view of a first representative embodiment (10M) of the mountable force measurement apparatus of the present invention, and especially adapted for use with a baseball bat type athletic club.

Both representative embodiments (10M, 10N) of the mountable force measurement apparatus utilize a conventional centrifugal forcemeter (20) comprising a light-transmissive barrel component 21 and a spindle component 26, both extending along a meter-axis 20A. Barrel component 21 has: a circular inner-surface 22 and a circular outer-surface 23, both surrounding meter-axis 20A; an open lead-end 24; and an open trail-end 25. Spindle component 26 includes at least one trailwardly flared portion (e.g. branched part 27) that provides a moderately frictionally resistive, primary contact between the barrel and spindle components. Thus, and as known to the prior art; when such forcemeter (20) is taped to an athletic club at a position remote of the club handle, whipping maneuvers of the club toward an imaginary projectile will cause the spindle (26) to protrude outwardly beyond barrel lead-end, and in direct proportion to centrifugal force furnished by the training athlete. In the latter regard, barrel outer-surface 23 is etched or otherwise provided with graduated measurement indicia that indicate the degree of forced movement of spindle 26 along barrel inner-surface 22.

Representative embodiments 10M and 10N of the mountable force measurement apparatus comprise: a fixture (30, 40) attached to and extending trailwardly of the forcemeter barrel component (21), said fixture having an underlying trough (32, 42) provided by upwardly convergent and preferably uniplanar trough-surfaces that are simultaneously abuttable against a linearly generated length of a selectable athletic club, the trough-surfaces remote from their convergent line merging with generally parallel rows (38, 39; 48, 49) of ear-like tabs; and flexible and preferably elastic girthing band means (50M, 50N) for engaging the fixture (30, 40) at said plurally-tabbed rows and also for simultaneously tightly girding the athletic club, thereby providing secure removable attachment of the fixture-carried forcemeter to the athletic club.

Figure 4:
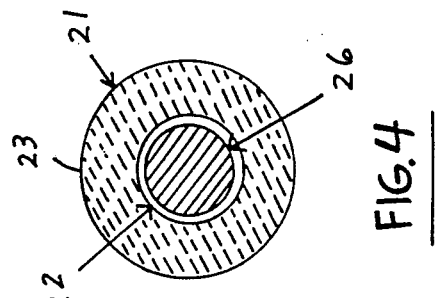
FIG. 4 is a sectional elevational view taken along lines 4—4 of FIGS. 1 and 5.
Figure 3:
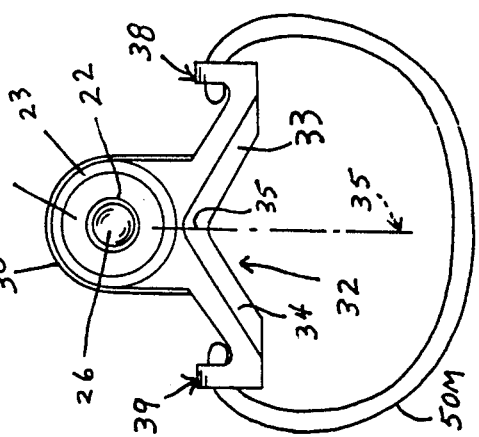
FIG. 3 is a leadward side elevational view of the FIG. 1 first embodiment.
Figure 2:
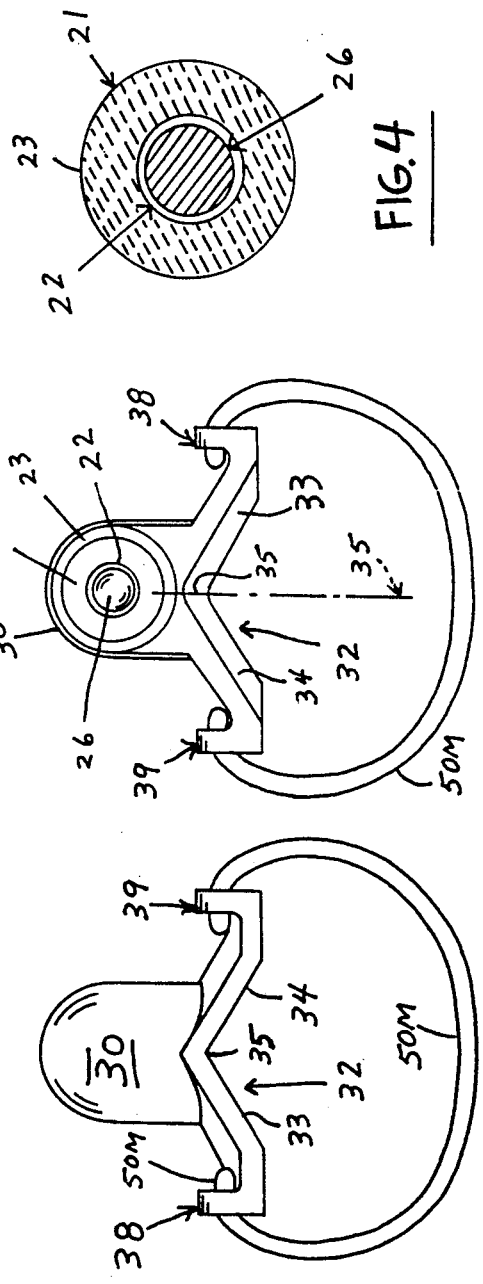
FIG. 2 is a trailward side elevational view of the FIG. 1 first embodiment.

For first embodiment 10M depicted in FIGS. 1–4 and 9, the fixture component 30 includes a leadward boss 31 that extends into forcemeter trail-end 25 and is thereat affixed (e.g. adhesive, etc.) whereby fixture 30 extends rigidly trailwardly of barrel 21. Fixture 30 has an underlying trough 32 provided by first-surface 33 and second-surface 34. Trough-surfaces 33 and 34 converge upwardly toward a convergency line 35 that lies along an imaginary vertical-plane passing through meter-axis 20A; however, convergency line 35 and meter-axis 20A are non-parallel, but rather (if indefinitely extended) converge leadwardly of barrel lead-end 24. As will be explained later in connection with FIGS. 8 and 9, such a non-parallel relationship between the trough convergency line (35) and the meter-axis (20A) is necessary whenever the linearly generated external contour of an athletic club is non-parallel to the club central-axis (CA). Remote of said trough convergency 35 and substantially parallel thereto, said trough first-surface 33 merges with a plural-tabs first-row portion 38; each ear-like tab of first-row 38 extends rigidly upwardly. Similarly remote of said trough convergency 35 and substantially parallel thereto, said trough second-surface 34 merges with a plural-tabs second-row portion 39; each ear-like tab of second-row 39 extends rigidly upwardly. Accordingly, first-row 38 and second-row 39 are substantially parallel to each other as well as to intervening convergency line 35. In addition to fixture component 30, first embodiment 10M comprises a flexible and preferably elastic girthing band 50M that is employed for removably engaging at least one tab of the respective rows 38 and 39 and also for simultaneously girding an athletic club i.e. the baseball bat type club of FIGS. 8 and 9.

For second embodiment 10N depicted in FIGS. 4–7, fixture component 40 includes a leadward boss 41 that extends into forcemeter trail-end 25 and is thereat affixed (e.g. adhesive, etc.) and whereby fixture 40 extends rigidly trailwardly of barrel 21. Fixture 40 has an underlying trough 42 provided by first-surface 43 and second-surface 44. Trough-surfaces 43 and 44 converge upwardly toward a convergency line 45 that lies along an imaginary vertical-plane passing through meter-axis 20A. Inasmuch as the linearly generated external contour of a golfclub shaft is ordinarily parallel to the shaft central-axis, covergency line 45 is desireably substantially parallel to meter-axis 20A. Remote of said trough convergency 45 and substantially parallel thereto, said trough first-surface 43 merges with a plural-tabs first-row portion 48; each ear-like tab of first-row 48 extends rigidly horizontally and away from a similar second-row 49. Similarly remote of said trough convergency 45 and substantially parallel thereto, said trough second-surface 44 merges with a plural-tabs second-row portion 49; each ear-like tab of second-row 49 extends rigidly horizontally and away from first-row 48. Accordingly, first-row 48 and second-row 49 are substantially co-elevational and parallel to each other as well as to the intervening convergency line 45. In addition to fixture component 30, second embodiment 10N comprises a flexible and preferably elastic girthing band 50N that is employed for removably engaging tabs from the respective rows 48 and 49 and also for simultaneously girding an appropriate athletic club e.g. a golfclub. In the latter regard, the discshaped ornamentation would be the fixture's closest proximity to the golfclub handle/grip.

Drawing FIG. 9 depicts in a general sense how a girthing band component (e.g. 50M, 50N) for the mountable force measurement apparatus provides a secure removable combination with various athletic clubs and depicts in a specific sense how girthing band 50M provides for secure removable and operational combination with the bell length (90B) of a baseball bat type (90) athletic club. It is seen that the linearly generated external contour (91) of bell length 90B is non-parallel to bat central-axis CA. If the trough convergency line 35 for fixture 30 were parallel to meter-axis 20A, forcemeter slidable spindle 26 would be on a collision course with bat contour 91 as bat 90 is being whipped toward an imaginary ball; such collision would render apparatus 10M inoperable. However, because convergency line 35 is non-parallel to meter-axis 20A, but instead leadward directional projections of 20A and 35 would intersect, forcemeter slidable spindle 26 is substantially parallel to (and non-collidable with) bat external contour 91. Accordingly, apparatus embodiment 10M, wherein trough-surfaces 33 and 34 simultaneously abut bat external contour 91, represents an operable removably attached combination with a baseball bat type athletic club.

From the foregoing, the construction and operation of the mountable force measurement apparatus will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

What is claimed is as follows:

1. Mountable force measurement apparatus in removably attached secure combination with a manually wieldable athletic club having a substantially linearly generated length portion along the club external contour, said combination comprising:

(A) a conventional centrifugal forcemeter comprising a light-transmissive barrel component having an inner-surface and an outer-surface both surrounding a meter-axis that is substantially co-parallel with said club linearly generated length portion, said barrel having a trail-end and an open lead-end, said forcemeter further comprising a spindle component extending along said meter-axis, said spindle including at least one flared portion that provides slidable contact between said spindle and barrel components;

(B) a fixture attached to the forcemeter and extending rigidly trailwardly of the barrel component, said fixture including a trough having two linearly generated trough-surfaces including a first-surface convergently merging at a convergency line with a trough second-surface, both said trough-surfaces simultaneously abutting the linearly generated length portion of said athletic club, said first-surface remote from said convergency line and substantially parallel to said club linearly generated length portion merging with a plural-tabs first-row portion of said fixture, and said second-surface remote from said convergency line and substantially parallel to said club linearly generated length portion merging with a plural-tabs second-row portion of said fixture; and (C) flexible girthing band means tightly girding said athletic club and also being removably engaged with at least one tab of said first-row portion and also with at least one tab of said second-row portion whereby said girthing band means maintains the fixture-attached forcemeter in removably attached secure condition against the linearly generated length portion of said athletic club.

2. The combination of claim 1 wherein the athletic club is a baseball bat having a linearly generated and divergent length portion; and wherein the trough-surfaces convergency is non-parallel with said meter-axis but substantially parallel to the bat divergent contour, whereby the forcemeter slidable spindle is non-collidable with the bat divergent contour.

3. The combination of claim 2 wherein projections of the trough convergency and the meter-axis intersect leadwardly of the forcemeter; wherein tabs of the first-row portion extend rigidly upwardly and away from the bat, and wherein tabs of the second-row portion extend rigidly upwardly from the fixture and away from the bat; and wherein the girthing band means is of annular form and provided of elastic material.

4. The combination of claim 1 wherein the trough-surfaces convergency is substantially parallel with said meter-axis; wherein the girthing band means is of annular form and provided of elastic material; and wherein tabs of the first-row portion extend away from the second-row portion and tabs of the second-row portion extend away from the first-row portion.

5. Mountable force measurement apparatus for use in removably attached combination with a manually wieldable athletic club having a substantially linearly generated length portion, said mountable force measurement apparatus comprising:

(A) a conventional centrifugal forcemeter comprising a light-transmissive barrel component having an inner-surface and an outer-surface both surrounding a meter-axis and having a trail-end and an open lead-end, and further comprising a spindle component extending along said meter-axis, said spindle including at least one flared portion that provides the primary contact between said barrel and spindle components;

(B) a fixture removably attachable to the forcemeter and extending trailwardly of the barrel component thereof, said fixture comprising a trough having two linearly generated and convergent trough-surfaces including a first-surface and a second-surface that merge at a convergency line, both said trough-surfaces being adapted to simultaneously abut a linearly generated length portion of said athletic club, said first-surface remote from the trough-surfaces convergency line and substantially parallel thereto merging with a plural-tabs first-row portion of said fixture, and said second-surface remote from the trough-surfaces convergency line and substantially parallel thereto merging with a plural-tabs second-row portion of said fixture; and (C) flexible girthing band means for engaging at least one tab of said first-row portion and at least one tab of said second-row portion whereby said girthing band means is adapted to provide removable attachment of said fixture to a said athletic club.

6. The mountable force measurement apparatus of claim 5 wherein the trough-surfaces convergency line is substantially parallel with said meter-axis whereby the apparatus is adaptable for removable attachment to a golf club.

7. The mountable force measurement apparatus of claim 5 wherein the trough-surfaces convergency line is non-parallel with said meter-axis whereby the apparatus is adaptable for removable attachment to a baseball bat type athletic club.

* * * * *